May 24, 1932.                J. H. PRETTYMAN                1,859,600
                          FRICTION CLUTCH MECHANISM
                           Filed Aug. 4, 1930       3 Sheets-Sheet 1
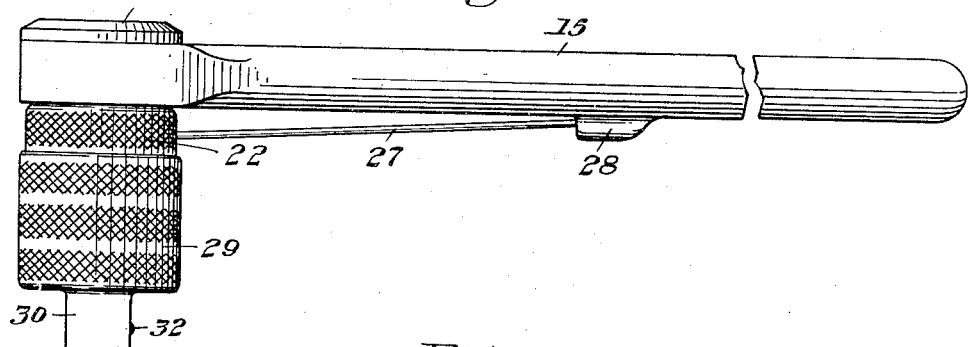
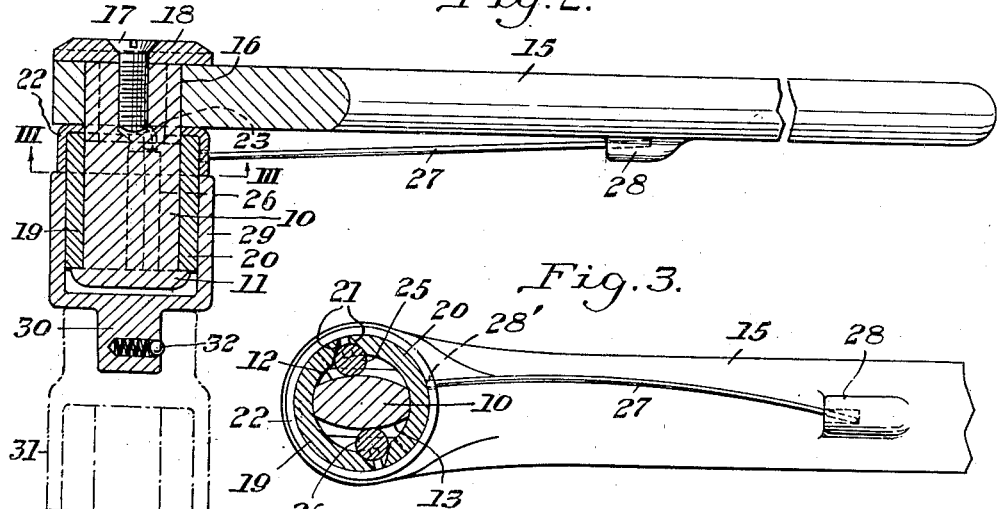
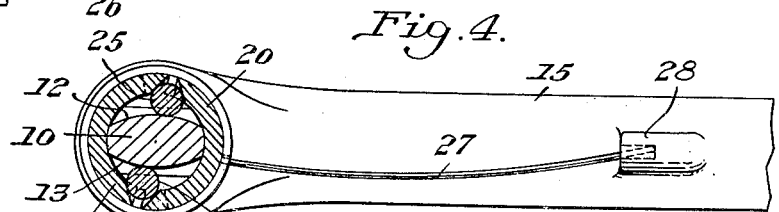
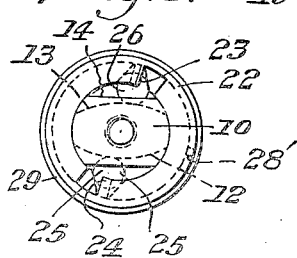
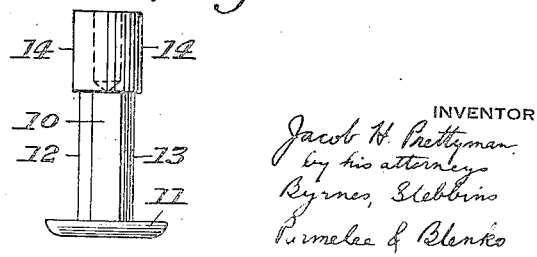

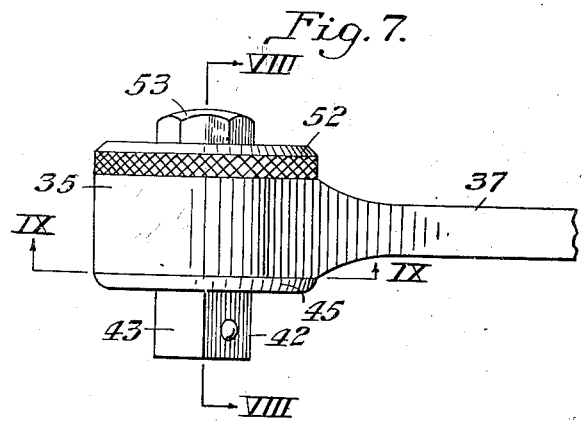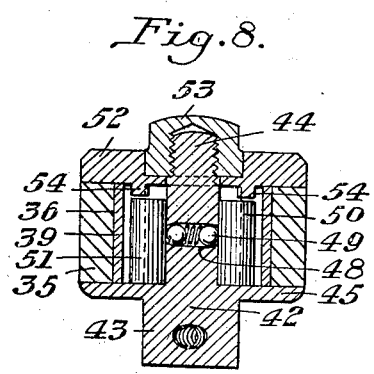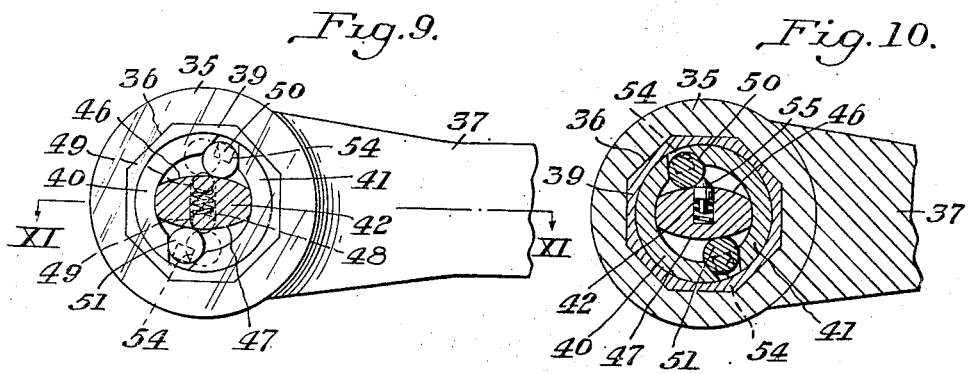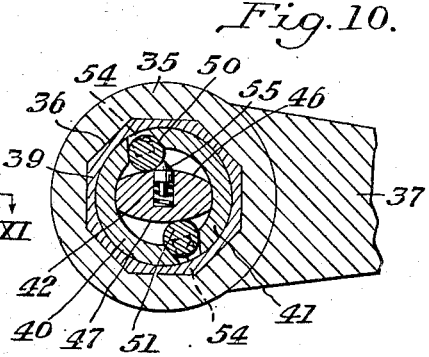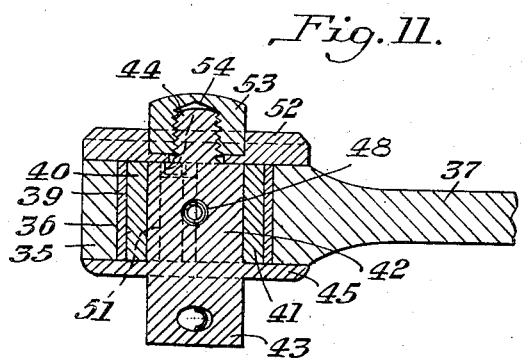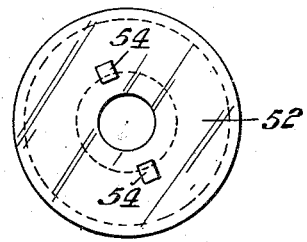

May 24, 1932. J. H. PRETTYMAN 1,859,600

FRICTION CLUTCH MECHANISM

Filed Aug. 4, 1930   3 Sheets-Sheet 3

INVENTOR
Jacob H. Prettyman
by his attorneys
Byrnes, Stebbins, Parmelee & Blenko Patented May 24, 1932

1,859,600

UNITED STATES PATENT OFFICE

JACOB H. PRETTYMAN, OF MARION, OHIO, ASSIGNOR TO THE FAIRFIELD ENGINEERING COMPANY, OF MARION, OHIO, A COMPANY OF OHIO

FRICTION CLUTCH MECHANISM

Application filed August 4, 1930. Serial No. 473,105.

My invention relates to means for causing intermittent frictional engagement between a driving member and a driven element. A device of this character has numerous applications and is particularly useful in hand tools similar to the ratchet wrenches and screw-drivers now well known. The invention will be described with reference to a wrench, although it is not to be limited thereto, since other embodiments may be constructed. Some of the other uses of which the device is capable are to drive oil-well drilling rigs, to transmit power generally, and to hold the load carried by a winch hoist from falling by its own weight.

In a device of this character, the desirable features are simplicity of construction, ease in selecting the direction of positive rotation desired, ease of replacement of wearing parts, and symmetrical distribution of the driving force. I have invented a friction clutch mechanism which is characterized by all these features.

According to the invention, I provide a driving member in the form of a pin or cylinder having cam surfaces formed thereon. An operating handle can be provided for the cam member. A plurality of wedging members such as the halves of an axially split sleeve are disposed about the pin and compression rollers or wedges inserted in the space between the cam surfaces of the pin and the ends of the sleeve portions. A friction drum or shell surrounds the sleeve and is adapted to have a sliding engagement therewith, except when the wedges are actuated to cause the split sleeve to grip the shell or drum. A knurled collar engaging the wedges affords means for shifting the position of the wedges and sleeve relative to the cam surfaces whereby frictional engagement of the sleeve and the drum will be effected only when the pin is turned in a given direction. When turned in the other direction, a freely sliding engagement of the shell with the sleeve results.

In another form of the invention, the cam member is driven by the friction drum.

For a complete understanding of the invention, reference is made to the accompanying drawings, in which Figure 1 is a side elevation of a wrench embodying one form of the invention;

Figure 2 is a central sectional view;

Figure 3 is a transverse sectional view taken along the line III—III of Figure 2;

Figure 4 is a similar view showing an alternate position of the moving parts;

Figure 5 is a plan view of the operating mechanism with the handle removed;

Figure 6 is a detail view of the driving pin;

Figure 7 is a view similar to Figure 1, showing a preferred form of the invention;

Figure 8 is a vertical section through Figure 7 on the line VIII—VIII, showing the device in neutral position;

Figure 9 is a sectional view of Figure 7 along the line IX—IX, showing the device in one of its off-center positions;

Figure 10 is a view similar to Figure 9, except that the section is taken through the longitudinal axis of the device shown in Figure 7, and shows a modified form of positioning means, the device being maintained thereby in its other off-center position;

Figure 11 is a sectional view along the line XI—XI of Figure 9;

Figure 12 is a plan view of a detail;

Figure 13:
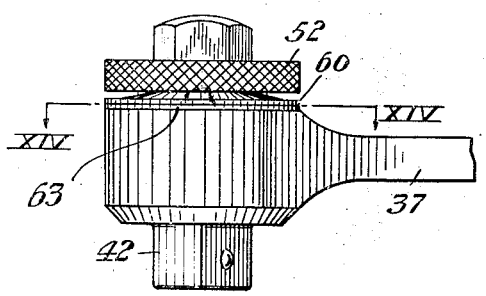
Figure 13 is a view similar to Figures 1 and 7 showing a still further modified form of positioning means for rendering the device effective in either desired direction.
Figure 15:
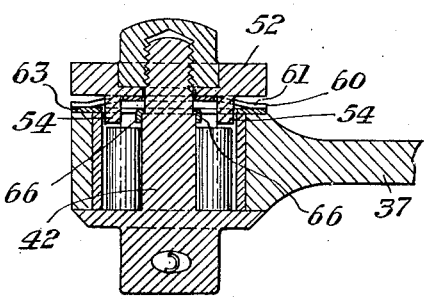
Figure 15 is a sectional view along the line XV—XV of Figure 14.

Referring in detail to the drawings, and particularly to Figures 1 through 6, the wrench illustrated comprises a pin 10 having an upset head or cap portion 11, and flattened cam surfaces 12 and 13. The other end of the pin has its sides flattened as at 14 for cooperating with a handle 15 having an opening 16 therein shaped to fit the flattened end of the pin 10. The pin 10 is secured to the handle 15 by a screw 17 and a cooperating washer 18.

Semicylindrical wedging members 19 and 20 such as the halves of an axially split sleeve are disposed about the cam surfaces of the pin 10. The ends of the wedging members are chamfered as at 21. The wedging members fit into a collar 22 on the pin 10 which serves to maintain them in position. As shown in Figure 2, the wedging members 19 and 20 fit between the collar 22 and the head 11 of the pin 10. The collar 22 has portions of its surface cut out and struck down to form tongues 23 and 24 projecting into the space between the chamfered ends of the wedging members 19 and 20. The tongues 23 and 24 serve to move the wedging members about the pin when the collar 22 is shifted thereon.

Cam rollers or wedges 25 and 26 fit into the spaces between the chamfered ends of the wedging members 19 and 20, and the cam surfaces 12 and 13 of the pin 10. A wire spring 27 extends from a pocket 28 in the handle 15 to a hole 28' in the collar 22. The spring 27 serves to maintain the wedging members 19 and 20 and the wedges 25 and 26 in either one of the positions illustrated in Figures 3 and 4, relative to the cam surfaces 12 and 13.

A friction drum or shell 29 surrounds the wedging members 19 and 20. The shell 29 is provided with a plug 30 which may be used for turning members having a socket for receiving it. For turning nuts or bolts, a socket 31 may be applied to the plug 30 of the shell 29, or any other type of gripping jaws or receiving means may be provided. A spring pressed ball 32 affords means for removably attaching this type of gripping mechanism to the plug 30.

In explaining the operation of the invention, it will be assumed that the plug 30 or the socket 31 is in engagement with a member to be rotated, such as a nut or the head of a bolt. If the handle 15 of the wrench, as shown in Figure 3, is now turned in a clockwise direction, it will be apparent that the cam surfaces 12 and 13 of the pin 10, which rotate with the handle, will force the wedges 25 and 26 outwardly. The wedges 25 and 26 thus force the wedging members 19 and 20 apart, by reason of the engagement of the rollers with the chamfered ends of the split sleeve. The sleeve portions 19 and 20 are thus caused to engage the interior of the drum 29 under such pressure that the friction therebetween transmits the movement of the handle 15 to the drum and thence to the member to be turned.

When the handle 15 is turned in a counter-clockwise direction, the pressure on the wedges 25 and 26 and the sleeve portions 19 and 20 is released, so that the handle 15 and the pin 10 move independently of the drum 29. The wrench may thus be employed in the manner of a ratchet device to cause the intermittent rotation of a nut, for example, in one direction, by oscillating the handle 15 through a limited angle.

When it is desired to turn a member in the opposite direction, its is only necessary to shift the position of the sleeve portions 19 and 20 by throwing the spring 27 to the position shown in Figure 4. With this adjustment of the sleeve and wedges, counter-clockwise movement of the handle expands the sleeve within the drum and causes a positive movement of the latter in that direction. When the handle is moved clockwise, the wedges descend the slope of the cam surfaces and permit the contraction of the sleeve so that the handle turns free of the drum. During the reverse movement of the handle 15, in either case, the spring 27 serves to maintain the sleeve portions 19 and 20 in such position that the wedges 25 and 26 are not engaged by the high points, namely the edges, of the cam surfaces 12 and 13. This prevents the expansion of the sleeve to seize the drum when the handle is being turned backward. When the handle is moved forward, however, the spring 27 aids the relative movement of the wedges on the cam surfaces whereby the sleeve is expanded to grip the drum 29. The spring 27 is effective, by its engagement with the collar 22, to move the sleeve portions which are engaged by the turned down projections 23 and 24 on the collar.

The invention disclosed is characterized by numerous advantages. In the first place, the direction of operation may be easily and quickly reversed merely by snapping the spring 27 to the desired position. All wearing parts are easily replaceable and are of small size, so that their renewal is not a matter of great trouble or expense. The actuating force is symmetrically distributed on the three points on which the wedges engage the cam surfaces and the chamfered ends of the sleeve portions. The driving force is uniformly distributed around the sleeve on the entire periphery of the friction drum. The construction is simple and inexpensive to manufacture, and is not likely to require repairs or replacement of parts.

Referring now particularly to Figures 7 through 12, a preferred form of the invention is shown therein, which is also described and illustrated as applied to a wrench or similar turning tool, although numerous other applications of this embodiment of the invention may be made.

The preferred form of the invention comprises a cylinder or barrel 35 having an octagonal hole 36 therethrough. A handle 37 is integral with the barrel 35 to form a wrench. An insert 39 of hardened steel having a circular bore is disposed in the hole 36. The hole 36 and insert 39 may be of any other irregular shape than that shown.

Semicylindrical sleeve portions 40 and 41 lie in the bore in the insert 39 and are similar to those previously described. A pin 42 is disposed centrally of the wedges 40 and 41 and has a square head 43 for engaging an object to be turned, a threaded end 44, a flange 45 overlying one face of the barrel 35, and a mid-portion having flattened cam surfaces 46 and 47. Centrally of the flattened mid-portion of the pin 42, a transverse bore 48 accommodates spring pressed balls 49. Compression wedges 50 and 51 are disposed between the ends of the wedges 40 and 41 and are maintained in either one of two off-center positions, illustrated in Figures 9 and 10, by the balls 49.

The other face of the barrel is closed by a collar 52 which is secured to the pin 42 by a nut 53. The collar 52 is provided with depending lugs 54 which extend into the space between the ends of the sleeve portions 40 and 41. The collar 52 fits loosely on the pin 42 and, by shifting the collar, the relative positions of the wedges and rollers with respect to the cam surfaces of the pin, may be changed from that shown in Figure 9 to that shown in Figure 10. As will be obvious from the description of the first form of the invention, this change causes the device to operate to transmit motion positively in a direction, the reverse of that for which it was previously set. The operation of the modified form is identical with that of the form of the invention already described, except that in the case of the modified form, force is applied to the friction drum surrounding the cam member, instead of to the latter as in the case of the first form.

Figure 10 shows an alternative positioning means for the wedges 50 and 51. This means comprises a spring pressed pin 55 having a pointed end, engaging one of the wedges 50 and 51.

A still further alternative means for positioning the wedges with respect to the cam surfaces of the pin is shown in Figures 13 through 17. The form of the invention shown in these figures is similar in other respects to that shown in Figures 7 through 12. The modified form of positioning means comprises a dished spring washer 60 provided with radial slots 61 and a central hole 62. A cooperating disc 63 has a hole 64 at the center thereof and diametrically opposite slots 65. Lugs 66 are turned down from the inner edge of the slots 65.

The washer 60 and the disc 63 are positioned on the threaded end of the pin 42. The lugs 66 overlie the cam surfaces on the pin 42 and insure that the disc 63 will be turned only when the pin 42 is turned. The collar 52 engages the wedges 40 and 41 by means of lugs 54, as previously described. The lugs 54 project through the slots 61 in the washer 60 and the slots 65 in the disc 63.

Figure 14:
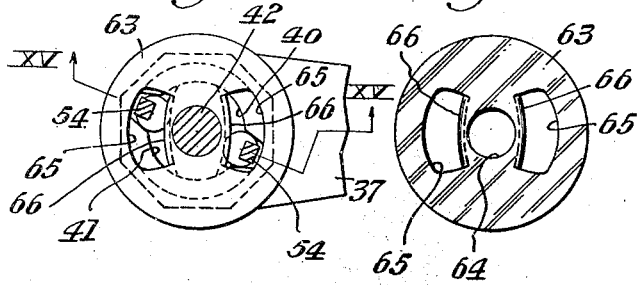
Figure 14 is a sectional view along the line XIV—XIV of Figure 13.
Figure 16:
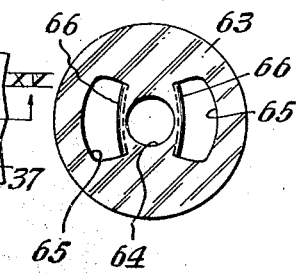
Figures 16 and 17 are plan views of details.
Figure 17:
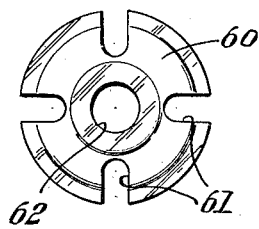

Figure 14 shows the wedges 50 and 51 positioned so as to effect positive movement of the pin 42 when the handle 37 of the wrench is turned in a clockwise direction, as viewed in Figure 14. When the handle 37 is turned in a counterclockwise direction, as seen in Figure 14, the frictional engagement between the washer 60 and the disc 63 maintains the collar 52 and, therefore, the lugs 54, the sleeve portions 40 and 41, and the wedges 50 and 51 in the position with respect to the pin 42 as shown in Figure 14, so that the sleeve portions are not forced into frictional engagement with the drum 39. Since the disc 63 is rigidly secured to the pin 42 and since the spring washer 60 frictionally engages the disc 63, the collar 52 will be moved only when the pin 42 is turned by the frictional engagement of the sleeve portions with the drum.

The collar 52 may be manually shifted against the friction exerted on the washer 60 by the disc 63 so that the wedges 50 and 51 occupy their alternative position. The movement of the collar, through the lugs 54, shifts the wedges and sleeve portions with respect to the pin so that the device is effective to transmit motion positively in a direction opposite to that described above. In either case, the position of the collar 52 is maintained by the frictional engagement of the washer 60 and the disc 63 until the collar is again manually shifted.

In addition to use in wrenches as shown in the drawings, the invention is capable of numerous other applications. It may be applied, for instance, to oil well drilling rigs where a prime mover, such as an internal combustion engine, is used to raise the drill and permit it to fall by its own weight. By using a friction drive of the type shown between the prime mover and the drilling rig, it will, obviously, be possible for the drill to fall at a greater speed than that permitted by the normal rotation of the prime mover. A harder blow is thus delivered by the drill and the drilling operation is correspondingly accelerated.

Another possible application of the invention is in connection with winch hoists. A worm and worm-wheel is generally used in these devices, where heavy loads are involved, both to multiply the lifting effort and to prevent the descent of the load after it has been raised.

My friction device may be advantageously applied to winch hoists for any kind of duty. It possesses particular advantages where a high hoisting speed is desirable, since it permits the use of a spur gear or other reduction by means of which a smaller ratio may be used than is possible with the worm and worm-wheel type of winch. The friction drive would be employed in this case as a uni-directional brake permitting free movement of the driving shaft of the winch in the hoisting direction, but preventing rotation in the lowering direction. The load might be lowered by changing the setting of the friction device to permit free movement of the winch driving shaft in the lowering direction, and lowering could then be accomplished by unwinding the winch at as high a speed as desired, and at a more rapid rate than would be possible with the worm drive previously mentioned.

As for the use of the friction drive shown for general power transmission, little need be said, since the invention may be used wherever it is desired to transmit power positively in one direction and to prevent positive connection of the driving means when rotating in the other direction. In addition, the invention may also be applied to elevator backstops.

The foregoing paragraphs do not, of course, exhaust the possibilities of the invention, since still further applications therefor will probably occur to those skilled in the various arts and industries.

Although I have described but a few preferred embodiments of the invention, it will be apparent that many changes therein may be made. For example, the driving force may be applied to the friction drum instead of to the pin having the cam surfaces. Such changes may, of course, be made without departing from the spirit of the invention as set forth in the following claims.

I claim:

1. A friction clutch comprising a drum having a cylindrical bore, a split sleeve therein adapted to expand for frictional engagement therewith, a wedge between the ends of said sleeve, a cam within the sleeve for expanding said sleeve and a collar for said drum mounted on said cam, having a lug projecting between the ends of the sleeve for maintaining said sleeve in a substantially fixed position relative to the cam.

2. A friction clutch comprising a drum having a cylindrical bore, a split sleeve therein adapted to expand for frictional engagement therewith, a wedge between the ends of said sleeve, a cam within the sleeve for expanding said sleeve, a collar for said drum mounted on said cam, having lugs projecting between the ends of the sleeve, and means carried by the cam for yieldingly restraining movement of said collar and sleeve relative to said cam.

3. A friction clutch comprising a drum having a bore therethrough, a split sleeve, a wedge between the ends of the sleeve for expanding it into frictional engagement with said bore, a cam in said bore for actuating said wedge, and means carried by the cam for adjustably maintaining substantially a predetermined relation between the cam and said drum comprising a collar having frictional relation with the cam, and a lug projecting from said collar between the ends of said sleeve.

4. A friction clutch including a drum having an axial bore, a split expanding sleeve therein, a wedge for expanding the sleeve, a cam for moving the wedge, and means for adjustably maintaining substantially a predetermined relation between the cam and wedge comprising a collar having a lug projecting between the ends of the sleeve, and means for causing frictional engagement between the cam and collar.

5. A friction clutch comprising a drum having an axial bore, an expansible split sleeve therein, an expanding wedge between the ends of the sleeve, a cam for actuating the wedge, a collar loosely mounted on the cam having lugs extending between the ends of the split sleeve, and a friction clutch between said collar and cam.

6. A friction clutch comprising a drum having an axial bore, a cam loosely fitting in said bore, a split sleeve and a wedge for expanding it adjustably disposed about the cam, a collar on the cam having a lug extending between the ends of the sleeve for adjusting the sleeve and wedge, said collar having frictional connection to the cam, to yieldably maintain the sleeve and wedge in adjusted position.

7. A friction clutch comprising a drum, a pin in the drum having cam surfaces, a split sleeve surrounding said pin, wedges cooperating with said surfaces and said split sleeve, means for yieldingly maintaining said wedges and sleeve in position to force the sleeve into engagement with the drum on relative rotation of the pin and drum in one direction, and means for shifting said wedges and sleeve to effect engagement of the sleeve and drum on relative rotation of the pin and drum in the other direction.

In testimony whereof I have hereunto set my hand.

JACOB H. PRETTYMAN.